Patented Apr. 26, 1932

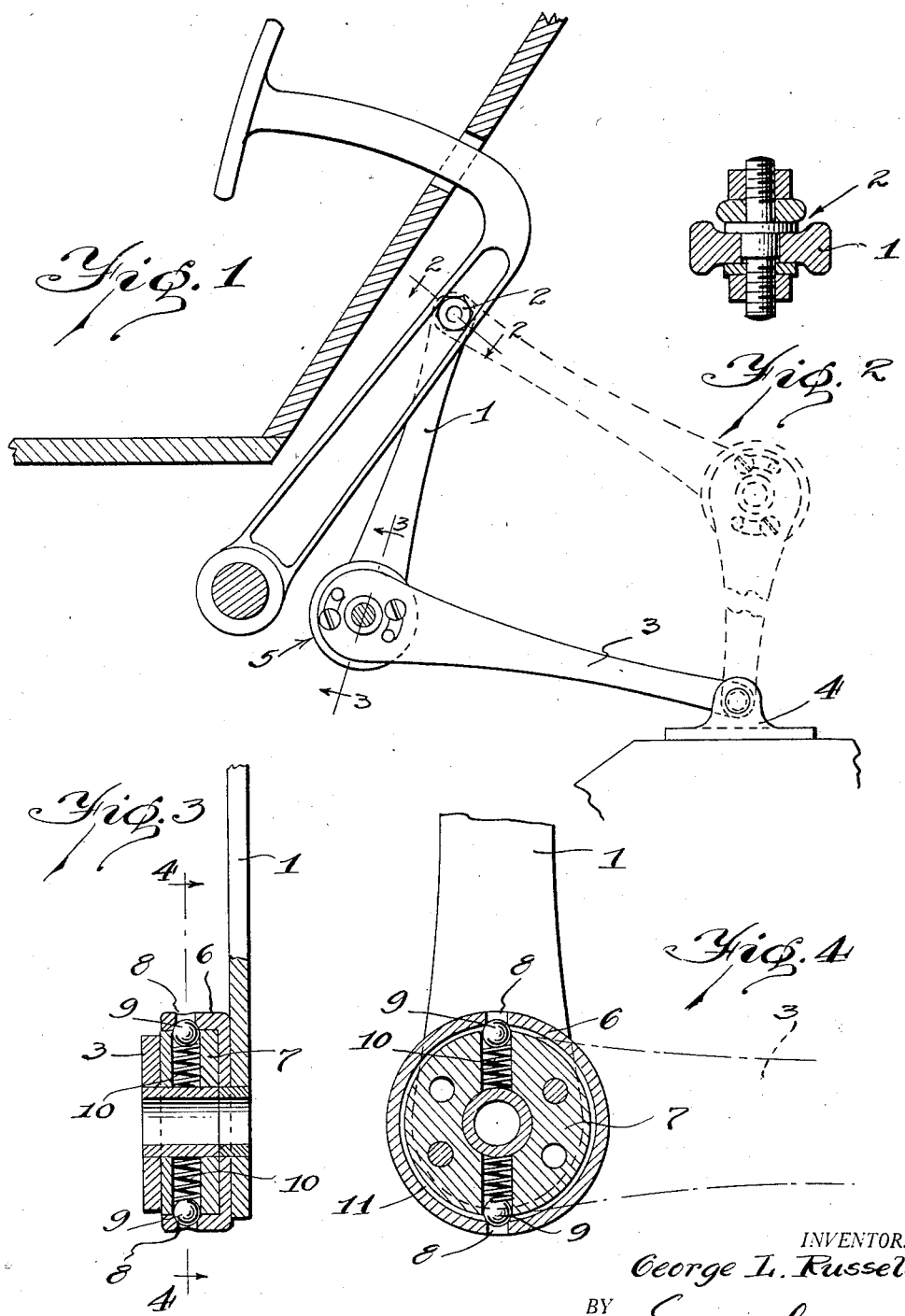

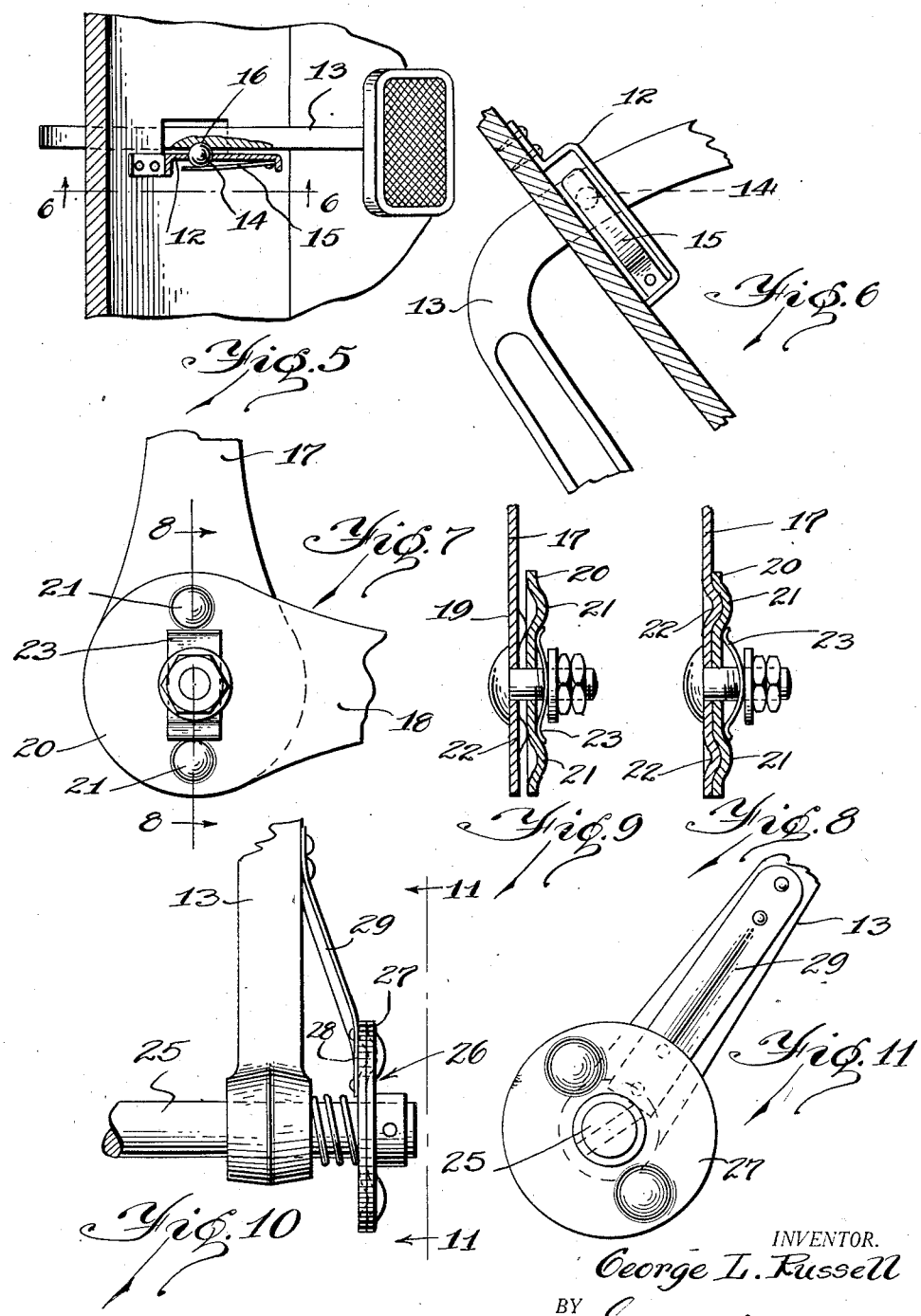

1,855,458

UNITED STATES PATENT OFFICE

GEORGE L. RUSSELL, OF DETROIT, MICHIGAN

CLUTCH CONTROL STRUCTURE

Application filed July 15, 1929. Serial No. 378,283.

This invention relates to clutch control structure, and has to do particularly with a device for positively preventing what is known as "riding" and "slipping" the clutch.

The abuse of "riding" the clutch is more generally practiced by fleet drivers and those persons not driving their own car, but is also practiced to a great extent by drivers of short coupled cars. "Slipping" the clutch is practiced by many drivers of all types of cars in the attempt to obtain a quick get away. Several devices have been designed in an attempt to overcome these clutch abusing tendencies but such devices in general have necessitated the use of other elements to be actuated upon by the foot or to in some way contact with the foot.

It is the object of the present invention to provide an extremely simple but positively acting device which controls the operation of the clutch and effectively prevents "riding" or "slipping", regardless of the manner in which the operator places his foot upon the clutch pedal. In other words, it is the object of the present invention to provide a device of this character which operates directly upon the clutch pedal or its connecting parts and thus relieves the driver from any bother of operating a protecting device. In this case, the driver can still practice or attempt to practice any habits which heretofore have resulted in "riding" and "slipping" of the clutch without in any way affecting the normal operation of the clutch.

Another feature of the present invention resides in the provision of a device which exerts sufficient tension against the clutch pedal to support the average weight of the foot and leg for merely resting thereon, but which will respond to or be actuated by a very slight additional pressure of the foot upon the clutch pedal whereby the clutch pedal may perform its usual clutch controlling operation. A still further feature inherent in this same structure resides in a means for positively returning the clutch pedal to what might be termed a locked position, or a normal inoperative position, whenever the clutch pedal is allowed to move back towards the point where the clutch is engaged.

Other features reside in the construction and arrangement of the various parts, as will be more clearly brought out in the specification and claims.

In the drawings:

Fig. 1 is a side elevation, partly in section, of a clutch pedal provided with a controlling device constructed in accordance with the present invention, one manner of installing the controlling device being shown in full lines and another in dotted lines.

Fig. 2 is a sectional view taken on line 2—2 of Fig. 1.

Fig. 3 is a sectional view taken on line 3—3 of Fig. 1, and illustrating in particular the structure for causing a snapping in action of the clutch pedal as it approaches its normal inoperative position.

Fig. 4 is a sectional view taken on line 4—4 of Fig. 3.

Fig. 5 is a plan view, partly in section, of a modified form of my invention wherein the clutch lever forms one element in the construction of the control device.

Fig. 6 is a sectional view taken on line 6—6 of Fig. 5.

Fig. 7 is a fragmentary side elevation illustrating the preferred form of clutch control structure.

Fig. 8 is a sectional view taken on line 8—8 of Fig. 7, and illustrating the position of the relative movable parts when the clutch is in inoperative position.

Fig. 9 is a sectional view similar to Fig. 8 but showing the position of the relatively movable parts upon actuation of the clutch pedal.

Fig. 10 is a fragmentary front elevation of a modified embodiment of the structure shown in Fig. 7 wherein the relatively movable control parts are affixed to the same shaft which supports the clutch pedal.

Fig. 11 is a side elevation of the structure shown in Fig. 10.

The gist of the present invention resides in means for normally retaining the clutch pedal in released inoperative position and for tending to automatically return such pedal to such position as the clutch is returned towards engaging position.

To accomplish this result, I have provided means which positively locks the clutch pedal in normal driving position until such time as the driver exerts sufficient force to overcome this locking force. As best shown in Fig. 1, this structure may comprise a suitable lever 1 pivotally connected to the clutch lever as at 2, a second lever 3 pivotally connected to any rigid support as at 4, and a control unit or housing 5 for connecting said levers 1 and 3.

As shown in Figs. 3 and 4, this control unit or housing 5 may comprise an outer shell 6 rigidly secured to the lever 1, and a cylindrical member 7 rigidly secured to the lever 3. The outer shell 6 is provided with diametrically positioned apertures 8 for receiving ball members 9 positioned in the cylinder 7, as best shown in Fig. 4, and resiliently backed by means of suitable coil springs 10. The shell 6 is also provided with an annular groove 11 which is in a plane in alignment with the axial line of movement of the ball members 9.

It will be obvious that if the relatively movable parts 6 and 7 are positioned as shown in Figs. 3 and 4 whereby the ball members are located in the apertures 8, that the levers 1 and 3 will be maintained at what might be termed a "locked" position. In other words, in order to cause relative movement between the levers 1 and 3 resistance of the ball members 9 must be overcome.

When sufficient force is applied to move one of the levers relative to the other whereby to disengage the ball members from the apertures 8, it will be obvious that these ball members will still travel in the groove 11 so as to prevent disengagement of the cylinder 7 from the shell 6. In order to positively disengage the two parts it is necessary to force the balls inwardly, the position shown in Figs. 3 and 4, whereby the cylinder may be easily moved outwardly to disengage the same.

It will be obvious that the levers 1 and 3 may take various different relative positions and that the control unit 5 may be fabricated in many different ways. The levers 1 and 3 and the control unit may be arranged as shown in dotted lines in Fig. 1, the main point in this particular design being that some form of control unit is provided which may be pivotally connected to the clutch lever itself and which will automatically lock such lever in normal driving position.

In Figs. 5 and 6, I have shown a modified form of clutch control wherein the control unit takes the form of a suitable standard or bracket 12 which may be secured to the footboard and which directly engages the clutch pedal 13 by means of a suitable ball member 14 inherently held in the bracket 12 by means of a spring 15. A suitable depression 16 is formed in the clutch lever to receive the ball 14 and thus lock the clutch lever in normal driving position.

In both the structure disclosed in Fig. 1 and Fig. 5, the ball units are preferably large whereby to obtain the maximum amount of snapping action. In practice, I prefer to have the ball of such size and the receiving depression of such size as to obtain substantially an inch and one-half "snapping" movement. Thus, in the construction shown in Figs. 5 and 6, it will be obvious that the clutch pedal will be temporarily locked in normal driving position by means of the engagement between the ball 14 and the depression 16. The force necessary to actuate the clutch lever against the resistance of the ball may be varied with different types of vehicles depending more or less upon the position of the driver, in the case of trucks, for instance, it might be necessary to have considerably more resistance against the initial movement of the clutch than would be ordinarily the case.

In any event the resistance provided by the resiliently backed ball should be sufficient to bear the weight of the foot upon the clutch, but to permit free movement of the clutch pedal after the resistance of the ball member has been overcome. As the clutch pedal is allowed to raise and just before the clutch itself is completely engaged, the relative position of the ball and the depression should be such as to cause the clutch to snap into temporary locked position.

This automatic snapping action will prevent any tendency to position the clutch pedal just out of this locking position and also prevent any tendency to slip the clutch in an attempt to make a quick get away. In other words, this automatic snapping action will tend to insure that the driving and driven members of the clutch will be either in positive engagement or disengagement.

My preferred form of device is very simple and inexpensive in construction and is best shown in Figs. 7, 8 and 9. This device may consist of two arms 17 and 18 similar to the structure shown in Fig. 1 but instead of being formed of the shell and cylinder it consists of two discs or plates 19 and 20. These discs may be formed integral with the levers 17 and 18 so as to provide a very simple stamping. Each disc is formed with similar diametrically positioned depressions or what might be termed ball members 21 and 22, whereby in the normal locked position of the two devices, as shown in Figs. 7 and 8, the working surface of the depression 21 will form a concave surface and the working surface of the depression 22 will form a convex surface.

The two members 19 and 20 may be held together in any suitable way and in Figs. 8 and 9 I have shown a suitable spring 23 for resiliently holding the two members together and suitable lock nuts for adjusting the tension between the two members 19 and 20, one of which is preferably rigidly secured. The device illustrated in Figs. 7 to 9 operates in substantially the same manner as the structure disclosed in Figs. 1 and 5, with the possible exception that it is somewhat easier to adjust the tension which must be overcome to disengage the control levers 17 and 18.

Figs. 10 and 11 illustrate a modified manner of applying the structure shown in Fig. 7. The structures shown in Figs. 1 to 7 are particularly adaptable for installation as accessories upon old vehicles, but the structure shown in Fig. 10 may be installed in connection with the original manufacture of the automobile. In this case, the clutch shaft 25 forms a supporting shaft for the control unit generally designated 26 and which is substantially identical in construction with the form shown in Figs. 8 and 9. However, in this case the one member of the control unit, such as 27, is secured directly to the shaft 26, thus eliminating one lever while the other unit 28 can be directly secured to the clutch pedal 13 by means of a connecting link 29. Any suitable spring or other means may be utilized for holding the two members 27 and 28 in operative contact. Thus in the case of the embodiment of the present device as original equipment in automobiles, it will be obvious that the structure of the same may be considerably simplified, the principles of operation, however, remaining exactly the same.

In both the forms shown in Figs. 7 and 10, a snapping movement is obtained at the top of the clutch movement whereby in normal operation of the clutch there will be a substantially slow motion going down but a fast snap or jumping action towards the end of the return stroke.

It will be understood that while the present device is effective to prevent unintentional slipping of the clutch during ordinary driving, it at the same time makes it possible to intentionally slip the clutch when necessary, as for instance when it is desired to allow the car to move only a few inches by just barely allowing the clutch face to grab.

What I claim is:

1. The combination with an automobile clutch pedal of the type having means tending to return same to normal position upon manual release, of means having a part thereof secured to a fixed part of the vehicle and another part or directly engaging and locking the clutch pedal in normal driving position until such time as the operator exerts sufficient pressure on the clutch pedal to overcome the locking force.

2. The combination with an automobile clutch pedal for motor vehicles, of means having a part thereof secured to a fixed element of the vehicle and another part engaging the clutch pedal, said two parts permitting the clutch pedal to freely return to its normal position but being so positioned and formed as to prevent movement of the clutch pedal by the weight of the operator's foot but permitting relatively free movement of the clutch pedal toward and into disengaging position after the same is once initially actuated.

3. A control device for friction clutch structure for motor vehicles comprising two relatively movable parts, one part being fixed to a stationary part of the vehicle, and the other part forming a part of the clutch operating structure, and means frictionally resisting initial relative movement between said two parts, but being so arranged as to cause an automatic snapping action and return of the clutch lever as it freely approaches normal driving position.

4. Friction clutch control structure for motor vehicles comprising in combination a self-returnable clutch lever adapted to be held in declutched position by manual effort and means having one part fixedly mounted on the vehicle and another part engaging said lever for normally resisting movement of the same from driving position and tending to automatically return the same to driving position when said clutch lever is returned to a position adjacent said driving position.

5. Clutch control means for motor vehicle friction plate clutches comprising in combination with a self-returnable clutch pedal, a pair of relatively movable members, one connected to the clutch lever and another to a fixed part of the vehicle, and laterally movable means tending to exert a resistance against movement of the clutch pedal only when moved away from normal position.

6. Clutch control means for motor vehicle friction plate clutches comprising in combination with a freely returnable clutch pedal, a pair of relatively movable members, one connected to the clutch lever and another to a fixed part of the vehicle, and resiliently supported laterally movable means tending to exert a resistance against movement of the clutch pedal only when moved away from normal position.

7. Clutch control structure for motor vehicle friction clutches, comprising in combination, a clutch pedal, an element adapted to move in unison with the clutch pedal, another element rigidly secured to a part of the vehicle and normally positioned in operative relation to said first element, and means for resiliently opposing initial relative movement between said two elements but assisting return to normal position when said clutch pedal is allowed to approach its top normal position.

8. Clutch control structure for motor vehicles comprising in combination an element adapted to move in unison with the clutch, another element rigidly secured to a part of the vehicle, and means for resiliently resisting only the initial relative movement between said two elements, said means being in the form of a concave surface and a convex surface resiliently held in complemental relationship, whereby said complemental relationship must be overcome to permit movement of the clutch actuating member but which complemental relationship in combination with said resilient means will tend to automatically readjust itself when one of said elements returns to a position adjacent normal position.

9. Clutch control mechanism for friction clutches freely movable to and from clutching and declutching positions, comprising, a clutch pedal, means rigidly secured to a fixed part of the vehicle and adapted to directly engage the clutch pedal and means forming a part of said mechanism for inherently locking the clutch pedal in normal driving position and for automatically forcing said clutch pedal into locked position when allowed to freely return to a position adjacent thereto.

10. The combination with a clutch pedal for motor vehicles, of means having a part thereof secured to a fixed element of the vehicle and another part forming a part of the clutch pedal, and resiliently mounted means cooperating with said two parts and arranged to permit the clutch pedal to freely return to its normal position but being so positioned and formed as to resist movement of the clutch pedal by the weight of the operator's foot but permitting relatively free movement of the clutch pedal toward and into disengaging position after the same is once initially actuated.

In testimony whereof I affix my signature.

GEORGE L. RUSSELL.